United States Patent [19]

Sloan et al.

[11] 4,110,187

[45] Aug. 29, 1978

[54] ULTRAVIOLET CURABLE POLYESTER BINDER AND COATING FORMULATION

[75] Inventors: Cephas H. Sloan; James G. Pacifici, both of Kingsport, Tenn.

[73] Assignee: Eastman Kodak Company, Rochester, N.Y.

[21] Appl. No.: 830,298

[22] Filed: Sep. 2, 1977

[51] Int. Cl.$^2$ .................. C08G 18/00; C08G 63/00
[52] U.S. Cl. .................. 204/159.19; 204/159.15; 260/873; 427/54; 428/430; 428/481
[58] Field of Search ............ 204/159.15, 159.19; 260/75 R, 873

[56] References Cited

U.S. PATENT DOCUMENTS

| | | | |
|---|---|---|---|
| 2,997,419 | 8/1961 | Lawton | 154/126 |
| 3,518,175 | 6/1970 | Bell | 204/159.19 |
| 3,783,004 | 1/1974 | Parker | 117/93.31 |
| 3,882,187 | 5/1975 | Takiyama et al. | 260/835 |
| 3,968,015 | 7/1976 | Nyberg | 204/159.15 |
| 4,025,492 | 5/1977 | Binsack et al. | 260/75 R |

*Primary Examiner*—Richard B. Turer
*Attorney, Agent, or Firm*—Elliott Stern; Daniel B. Reece, III

[57] ABSTRACT

Ultraviolet radiation curable composition comprising a solution of (A) from 5 to about 50 percent by weight of a polyester of terephthalic acid esters and a glycol of from about 60 mole percent to 100 mole percent 1,2-propylene glycol and from 0 to about 40 mole percent ethylene glycol; said polyester having an inherent viscosity of from about 0.05 to about 0.60; and (B) from 95 to 50 percent by weight of an ethylenically unsaturated photopolymerizable compound, are useful as binders and coating compositions.

12 Claims, No Drawings

ULTRAVIOLET CURABLE POLYESTER BINDER AND COATING FORMULATION

This invention concerns unique formulations of photocurable binder and coating compositions composed of specific amorphous linear aromatic polyesters in combination with a photopolymerizable unsaturated monomer. These formulations can be used as binders for nonwoven fabrics or in wood, metal, or fabric coatings. The preferred polyesters are prepared from terephthalic acid esters such as dimethyl terephthalate and 1,2-propanediol or from terephthalic acid esters and mixtures of 1,2-propanediol and ethylene glycol having an inherent viscosity of from 0.05 to about 0.6. These polyesters can be dissolved in the photopolymerizable monomer in concentrations up to 50%. The preferred monomers are acrylate esters, in particular, glycidyl acrylate, and glycidyl methacrylate. When sprayed or otherwise applied to a nonwoven mat and exposed to ultraviolet (U.V.) or near ultraviolet radiation, an instant bond is achieved. Likewise, when coated on a fabric, metal, or wood substrate, a tough glossy finish is obtained when exposed to U.V. radiation. The hardness and solvent resistance of the surface finish can be varied by the use of polyfunctional comonomers. These unique formulations release no solvents into the atmosphere and require no heat energy for curing.

Most binders for nonwoven fabrics are used in the form of aqueous emulsions of a dispersed polymer. The acrylic polymers such as ethyl acrylate, methyl methacrylate are widely used. Other binders used in aqueous emulsions are poly(vinyl acetate), ethylene vinyl acetate, and poly(vinyl chloride). Usually the emulsion is applied to the nonwoven web by a saturation technique. The web is then passed between rollers to remove the excess emulsion, conveyed to drying ovens to remove the water, and then passed into high temperature ovens for curing.

In fabric coating operations, polymeric coatings are applied from solvents. The solvents must be removed by heat. In most cases, the carrier solvents are released into the atmosphere.

In almost all cases of binder applications for nonwovens or polymeric, fabric coatings, metal or woodcoating operations, considerable heat energy is involved and some pollution problems may arise. In the present invention, no solvents or aqueous emulsions are involved and no drying ovens are needed. Thus, energy requirements are at a minimum and no pollution is generated. Further, it was unexpected to find that the amorphous poly(propylene terephthalate) was soluble in photopolymerizable monomers of the invention in concentrations of up to 50% by weight.

Accordingly, we have provided a radiation curable coating composition comprising a solution of
(A) from 5 to about 50 percent by weight of a polyester of terephthalic acid ester and a glycol of from about 60 mole percent to 100 mole percent 1,2-propylene glycol and from 0 to about 40 mole percent ethylene glycol; said polyester having an inherent viscosity of from about 0.05 to about 0.60 in a 60/40 parts by weight solution of phenol/tetrachloroethane at 25° C. at a concentration of 0.5 g. of polyester in 100 ml. of said solvent; and
(B) from 95 to 50 percent by weight of an ethylenically unsaturated photopolymerizable compound.

In a preferred embodiment of this invention, Component (A) is present in amount of from 10 to about 30 percent by weight.

In an especially preferred embodiment, the polyester is poly(1,2-propylene terephthalate) having an inherent viscosity of from 0.1 to about 0.50, and the ethylenically unsaturated photopolymerizable compound is predominantly glycidyl acrylate or glycidyl methacrylate.

A preferred range of copolyesters useful in the practice of this invention are those in which the range of ethylene glycol is 20 to 40 mole percent, and the 1,2-propylene glycol is in the range of 80 to 60 mole percent, based on a total glycol content of 100 mole percent.

These compositions may be applied by spraying, brushing, or roll coating onto an article. The article is exposed to high intensity U.V. light for a given period of time. A tough film is instantly formed and the article is ready for use.

The coatings thus formed have several advantages over previous coatings. The coatings are tough and have superior impact strength to cellulosic coatings. No drying or curing ovens are needed to cure the polymeric coating and pollution is reduced to a minimum.

The polyesters may be prepared from dialkyl esters of the dicarboxylic acids and the glycols in the presence of suitable catalysts in a manner well known in the art. U.S. Ser. No. 748,037, filed Dec. 6, 1976, incorporated herein by reference, discloses these polymers as well as their method of preparation.

The ethylenically unsaturated compounds useful in the present invention can be, for example, lower alkyl and substituted alkyl esters of acrylic and methacrylic acid. Examples of such esters include: methyl methacrylate, ethyl methacrylate, 2-ethylhexyl methacrylate, isobutyl methacrylate, glycidyl methacrylate, glycidyl acrylate, butyl acrylate, 2-hydroxyethyl acrylate, 2-methoxyethyl acrylate, 2-phenoxyethyl acrylate, 2-hydroxypropyl acrylate, benzyl acrylate, tetrahydrofurfuryl acrylate. Also useful are polyacrylyl compounds represented by the general formula:

R is hydrogen or methyl; G is a polyvalent alkylene group of the formula

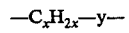

in which X is 2 to 10 and $y$ is 0 to 2 [e.g., (a) divalent alkylene such as $C_xH_{2x}$ when $y = 0$, i.e., $-C_2H_4$, $-C_3H_6-$, $-C_5H_{10}-$, neo $-C_5H_{10}$, and the like; (b) trivalent alkylene such as $C_xH_{2x}-1$ when $y = 1$, i.e.,

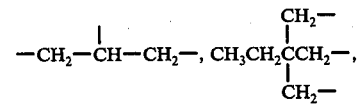

and the like; or (c) tetravalent alkylene such as $C_xH_{2x-2}$ when $y = 2$,

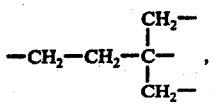

and the like]; a divalent $(C_tH_{2t}O)_kC_tH_{2t}$ — group in which $t$ is 1 to 10 (e.g., oxyethylene, oxypropylene, oxybutylene, polyoxyethylene, polyoxypropylene, polyoxybutylene, polyoxyethylene-oxypropylene, —$CH_2C(CH_3)_2COOCH_2C(CH_3)_2CH_2$—, etc.); and $r$ is the valence of G and can be from 2 to 4. Also useful are allyl acrylates and methacrylates, e.g., allyl methacrylate, allyl acrylate, diallyl acrylate. Other unsaturated compounds useful in the invention are vinyl acetate, vinyl and vinylidine halides; e.g., vinyl chloride, vinylidene chloride; amides, e.g., acrylamide, diacetone acrylamide; vinyl aromatics; e.g., styrene, alkyl stryenes, halostyrenes, and divinyl benzenes.

The photosensitizers useful in the practice of this invention are well known in the art and are disclosed in various publications and patents such as U.S. Pat. Nos. 3,686,084, 3,728,377, 3,912,606, 3,962,055, 3,962,056, 3,988,228, 4,012,302, the previously mentioned patents, as well as 3,692,560, and 3,878,065; all incorporated herein by reference.

These photoinitiators are used in amounts of from 0.5 to 25% by weight and preferably from 1 to 15% of the total photocurable composition. Typical photoinitiators which are applicable in these systems are benzils, benzoin ethers, halomethyl ketones, aromatic substituted aliphatic ketones, and aromatic ketones in combination with amines. Specific examples of these photoinitiators are benzil, isopropyl benzoin ether, isobutyl benzoin ether, diethoxy acetophenone, 4,4'-bis(chloromethyl)-benzophenone, 3,4-bis(chloromethyl)benzophenone, α-chloroacetophenone, 4-tert-butyl-α,α,α-trichloroacetophenone, benzophenone/methyl diethanol amine. The photoinitiators may be added at any time in the production of the photopolymerizable compositions in amounts conventionally used for photoinitiators.

The following examples are illustrative of the present invention.

EXAMPLE 1

A stock solution of 50 grams of glycidyl acrylate and 50 grams of 2-ethylhexylacrylate was prepared. To 5.0-gram portions of this solution was added 2.5 grams of the following aromatic polyesters.

1. Poly(ethylene terephthalate) (I.V. = 0.30)
2. Poly(1,4-cyclohexylenedimethylene terephthalate) (I.V. = 0.30)
3. Poly(1,6-hexylene terephthalate) (I.V. = 0.33)
4. Poly(neopentylene terephthalate) (I.V. = 0.20)
5. Poly(diethylene glycol terephthalate) (I.V. = 0.25)
6. Poly(1,4-butylene terephthalate) (I.V. = 0.35)
7. Poly(1,4-cyclohexylenedimethylene 50/50 terephthalate/isophthalate) (I.V. = 0.48)
8. Poly(1,2-propylene terephthalate) (PPT) (I.V. = 0.46)

These mixtures were rolled on a roll-mill overnight (15 hours) and inspected for solution of the polymer. Of these polyesters, only poly(propylene terephthalate) (PPT) formed a clear homogenous solution. The other systems showed no evidence of dissolving in the acrylate monomer system.

EXAMPLE 2

A stock composition was prepared containing the following:

PPT (I.V. = 0.3): 100 grams
glycidyl acrylate (GA): 60 grams
2-ethylexylacrylate (2-EHA): 60 grams Portions of this composition (5.0 grams) were combined with 0.25 gram of a series of photoinitiators. The compositions were coated (≃2 mil) on glass slides and exposed, under a blanket of nitrogen, to a Gates 420 U11B mercury lamp (80 watts/inch of arc) for 30 seconds. The results are as follows:

| Photoinitiator | Results |
|---|---|
| None | Not cured |
| 4,4'-bis(chloromethyl)benzophenone | Cured tack-free |
| 3,4-bis(chloromethyl)benzophenone | Cured tack-free |
| diethoxy acetophenone | Cured tack-free |
| Isopropyl benzoin ether | Cured tack-free |
| Isobutyl benzoin ether | Cured tack-free |
| Benzophenone/methyl diethanol amine | Cured tack-free |
| 4-tert-butyl-α,α,α-trichloroacetophenone | Cured tack-free |

EXAMPLE 3

The following compositions were prepared:

| A. | PPT (I.V. = 0.43) | 50 grams |
|---|---|---|
| | GA | 30 grams |
| | 2-EHA | 30 grams |
| | 4,4'-bis(chloromethyl)benzophenone | 5 grams |
| B. | PPT (I.V. = 0.39) | 50 grams |
| | GA | 30 grams |
| | 2-EHA | 30 grams |
| | 4,4'-bis(chloromethyl)benzophenone | 5 grams |
| C. | PPT (I.V. = 0.14) | 50 grams |
| | GA | 30 grams |
| | 2-EHA | 30 grams |
| | 4,4'-bis(chloromethyl)benzophenone | 5 grams |

The compositions were coated (2 mil) on glass slides and exposed, under nitrogen, to a Gates 420 U11B mercury lamp (80 watts/inch of arc) for 30 seconds. Each sample cured to give a tack free surface. Samples were coated on aluminum foil and cured for 30 seconds. The cured samples showed excellent flexibility and could be folded without loss of adhesion to aluminum and fracture of the coating.

EXAMPLE 4

A stock composition containing 200 grams of PPT (I.V. = 0.39), 120 grams of glycidyl acrylate, and 32 grams of 4,4'-bis(chloromethyl)benzophenone was prepared. To 5.0-gram portions of this composition was added 5.0 grams of the following acrylic monomers. Film coated (2.0 mil) on glass slides were exposed to a Gates 420 U11B mercury lamp (80 watts/inch of arc) under nitrogen and their tack free time determined. The results were as follows:

| Acrylic Monomer | Tack Free Time (sec.) |
|---|---|
| Butyl acrylate | 18 |
| 2-Hydroxypropyl acrylate | 22 |
| 2-Ethylhexyl acrylate | 17 |
| Glycidyl methacrylate | 28 |
| Phenoxyethyl acrylate | 15 |
| Methoxyethyl acrylate | 15 |

-continued

| Acrylic Monomer | Tack Free Time (sec.) |
|---|---|
| Benzyl acrylate | 15 |
| Neopentyl glycol diacrylate | 10 |
| Diethylene glycol diacrylate | 7 |
| Tetramethylene glycol diacrylate | 8 |
| Trimethylolpropane triacrylate | 15 |

EXAMPLE 5

A stock composition was prepared containing the following:

PPT (I.V. = 0.39): 100 grams
Glycidyl acrylate: 60 grams
2-Ethylhexylacrylate: 60 grams
4,4'-Bis(chloromethyl)benzophenone: 12 grams The solution was sprayed, using a laboratory spray gun, onto nonwoven poly(ethylene terephthalate) fiber mats at 10, 20 and 30 weight percent. These coated fibers were then exposed to a Gates 420 U11B mercury lamp for 30 seconds under nitrogen. The bonding characteristics of the coating were determined by examination of the fibers under a microscope which showed that bonding occurs at the fiber-fiber interfaces.

EXAMPLE 6

A composition containing the following was prepared:

PPT (I.V. = 0.23): 100 grams
Glycidyl methacrylate: 60 grams
Neopentyl glycol diacrylate: 60 grams
4,4'-bis(chloromethyl)benzophenone: 10 grams Samples were coated on glass slides and exposed under a nitrogen atmosphere to a Gates 420 U11B mercury lamp for 30 seconds. The pencil hardness of the cured films were HB to H.

EXAMPLE 7

The following compositions were prepared, coated (2-mil) on glass slides and exposed to a Gates 420 U11B mercury lamp. The cure time and pencil hardness of the systems were then determined.

| Components | Compositions | | | |
|---|---|---|---|---|
| | A | B | C | D |
| Hetron 520* | 100 | 90 | 85 | 75 |
| PPT (I.V. = .23) | 0 | 5 | 10 | 20 |
| 4,4'-bis(chloromethyl)benzophenone | 5 | 5 | 5 | 5 |
| Cure Time (seconds) | 58 | 58 | 42 | 33 |
| Pencil Hardness | H | H | H | H |

*Unsaturated polyester (IPA/MA/PG) in styrene monomer.

The systems containing PPT showed much less "orange peel" than the control. Those containing 10 and 20% PPT were essentially "orange peel" free.

Composition D was coated on wood panels and cured for 60 seconds. The cured panels were then sanded to a smooth finish. The panels were then coated with a #20 wire wound draw rod and cured for 30 seconds. The cured panel had a pencil hardness of H, were smooth and had high gloss (showed no orange peel or craters).

The invention has been decribed in detail with particular reference to certain preferred embodiments thereof, but it will be understood that variations and modifications can be effected within the spirit and scope of the invention.

We claim:

1. A radiation curable composition comprising a solution of
   (A) from 5 to about 50 percent by weight of a polyester of terephthalic acid esters and a glycol of from about 60 mole percent to 100 mole percent 1,2-propylene glycol and from 0 to about 40 mole percent ethylene glycol; said polyester having an inherent viscosity of from about 0.05 to about 0.60 in a 60/40 parts by weight solution of phenol/tetrachloroethane at 25° C. at a concentration of 0.5 g. of polyester in 100 ml. of said solvent;
   (B) from 95 to 50 percent by weight of an ethylenically unsaturated photopolymerizable compound; and
   (C) An effective amount of a photoinitiator.

2. The composition of claim 1 wherein component (A) is present in an amount of from 10 to about 30 weight percent.

3. The composition of claim 1 wherein component (B) is selected from glycidyl acrylate and glycidyl methacrylate.

4. The composition of claim 2 wherein component B is selected from glycidyl acrylate and glycidyl methacrylate.

5. The composition of claim 1 wherein the polyester is poly(1,2-propylene terephthalate) having an inherent viscosity from 0.1 to about 0.5.

6. The composition of claim 2 wherein the polyester is poly-(1,2-propylene terephthalate) having an inherent viscosity from 0.1 to about 0.5.

7. The composition of claim 3 wherein the polyester is poly(1,2-propylene terephthalate) having an inherent viscosity from 0.1 to about 0.5.

8. The composition of claim 4 wherein the polyester is poly(1,2-propylene terephthalate) having an inherent viscosity from 0.1 to about 0.5.

9. The composition of claim 1 wherein the photoinitiator is selected from benzoin esters, halomethyl ketones or aromatic ketones in combination with amines.

10. The composition of claim 2 wherein the photoinitiator is selected from benzoin ethers, halomethyl ketones or aromatic ketones in combination with amines.

11. The composition of claim 3 wherein the photoinitiator is selected from benzoin ethers, halomethyl ketones or aromatic ketones in combination with amines.

12. The composition of claim 4 wherein the photoinitiator is selected from benzoin ethers, halomethyl ketones or aromatic ketones in combination with amines.

* * * * *